United States Patent [19]

Demos

[11] Patent Number: 4,745,968
[45] Date of Patent: May 24, 1988

[54] COOKING SPIKE APPARATUS

[76] Inventor: Jim P. Demos, 203 Burnt Leaf La., Brentwood, Tenn. 37027

[21] Appl. No.: 302,541

[22] Filed: Sep. 16, 1981

[51] Int. Cl.⁴ ............................................. A47J 37/04
[52] U.S. Cl. ...................................... 165/185; 99/419; 99/421 A; 426/523
[58] Field of Search .................. 165/185; 99/419, 421, 99/442, 421 A; 426/523, 420

[56] References Cited

U.S. PATENT DOCUMENTS

| | | |
|---|---|---|
| 267,535 | 11/1882 | Hurd . |
| 1,890,907 | 12/1932 | Hoover ............................ 165/185 X |
| 2,404,166 | 7/1946 | Danilla ............................ 165/185 X |
| 2,651,251 | 9/1953 | Brown ............................. 165/185 X |
| 2,766,682 | 10/1956 | Smith . |
| 2,835,480 | 5/1958 | Perez . |
| 3,379,118 | 4/1968 | Perez ............................... 99/442 |
| 3,635,732 | 1/1972 | Bisset ............................. 99/419 |
| 4,170,933 | 10/1979 | Meamber ........................ 99/419 |
| 4,217,817 | 8/1980 | Meamber . |

FOREIGN PATENT DOCUMENTS 3009386 9/1981 Fed. Rep. of Germany ........ 99/412

Primary Examiner—Albert W. Davis, Jr.
Attorney, Agent, or Firm—Luedeka, Hodges & Neely

[57] ABSTRACT

The specification discloses a steak-cooking spike apparatus (10) for being inserted into an edge (36) of a steak (34). The spike apparatus (10) includes a heat-absorbing rod (12) for being positioned adjacent to the steak (34) immediately above the adjacent to a grill (48) to absorb heat from the grill (48). A plurality of heat-conducting spikes (26) extend from the midsection of the rod (12) in a direction perpendicular to the width of the rod (12). The spikes (26) are positioned in a row along the midsection of the rod (12) and are oriented in a parallel, co-planar relationship for being inserted into the edge of the steak (34) for transmitting heat to the center interior thereof.

7 Claims, 1 Drawing Sheet

COOKING SPIKE APPARATUS

FIELD OF INVENTION

The present invention relates to pins or spikes for transmitting heat, to the interior of a body, and particularly relates to a heat transfer spike apparatus for transmitting heat to the interior of a steak while cooking it on a grill.

BACKGROUND OF THE INVENTION

It is known to transfer heat to the interior of a body by inserting into the body a pin or spike that conducts heat. The pin absorbs heat from the exterior of the body and transfers the heat to the interior thereof. In this manner, the interior of the body, such as a piece of meat, is cooked.

For example, skewers or thermal pins for insertion into large pieces of meat, such as a roast or turkey, are disclosed in U.S. Pat. Nos. 2,404,166; cooling potatoes or the like are disclosed in U.S. Pat. Nos. 3,379,118 and 2,766,682. These devices are ill-suited for cooking slabs of meat, such as a asteak, for readily apparent reasons.

U.S. Pat. Nos. 4,217,817 and 4,170,933 disclose devices for cooking slabs of meat on a grill in a reduced time. These devices include a plate that is positioned over the slab of meat with a plurality of spikes extending downwardly from the plate into the slab of meat. The plate and the spikes must be preheated before they are placed on the meat, and once placed on the meat, the spikes transmit heat from the plate through the flat side of the slab of meat into the interior thereof.

Such cooking devices are not well-suited for cooking steaks because the devices will form a multitude of holes or perforations in the flat side of the steak that are plainly viewable by a diner eating the steak and are generally unappetizing. The perforated appearance of a steak cooked with such a device also may be associated with fast food restaurants or cheaper meats which some diners may find undesirable. The need to preheat the plate and the spikes extending therefrom in these types of devices is also undesirable because it is usually necessary to utilize a portion of the grill to heat the device. In a restaurant where many steaks are being prepared, the plate and spikes will take up space on the grill that would otherwise be available for cooking a steak and, thus, would limit the maximum steak-cooking efficiency of the grill.

Thus, a need has arisen for a steak-cooking apparatus that does not give the steak a perforated appearance on the exposed flat side, that does not require preheating and that utilizes a minimum of grill space when in use.

SUMMARY OF INVENTION

The present invention solves the foregoing and other problems associated with thermal pins or spikes by providing a steak-cooking spike apparatus that is adapted and designed for insertion into the edge of the steak, is operable to absorb and transfer heat while the steak is cooking on a grill, and does not require preheating. In accordance with the present invention, a steak-cooking spike apparatus is designed for being inserted into the edge of the steak and for transmitting heat to the center interior of the steak while the steak is cooking on the grill. The steak into which the spike apparatus is inserted has a predetermined length, width and thickness. The spike apparatus includes a heat-absorbing rod for being positioned adjacent to the steak immediately above and adjacent to the grill to absorb heat from the grill, and the rod has a selected thickness and has a length of about the length of the steak. The width of the heat-absorbing rod is approximately equal to the thickness of the steak. A plurality of heat-conducting spikes extend from the midsection of the rod in a direction perpendicular to the width of the rod, and the spikes are positioned in a row along the midsection of the rod and are oriented in a parallel, co-planar, relationship for being inserted into the edge of a steak. When inserted into the steak, the spikes are positioned in a spaced apart parallel relationship with the grill so that heat transmitted from the grill is absorbed by the rod and is transmitted through the spikes into the center interior of the steak.

In one embodiment, the spikes have a length approximately equal to but slightly shorter than the width of the steak. In another embodiment of the invention, the spikes have a length approximately equal to one-half the width of the steak so that two steak-cooking spike apparatuses may be inserted into the steak, one on each side of the steak through opposing edges of the steak. In both embodiments, the steak spikes are spaced apart on the rod at distances approximately equal to the width of the rod which is approximately equal to the thickness of the steak.

The spikes may comprise a plurality of nails attached to the rod. In the preferred embodiment, a plurality of bores are formed in the rod extending in a direction perpendicular to the width of the rod and through the thickness of the rod. A plurality of recesses are formed in the rod adjacent to and aligned with the bores. Heads are formed on the ends of the nails and are dimensioned to fit within the recesses, and the nails are inserted through the bores with the heads positioned within the recesses. The nails are fastened in the bores and the heads are fastened in the recesses in such a manner as to transmit heat between the heat-absorbing rod and the nails and heads. For example, the nails may be welded or soldered to the bores and recesses.

Since the heat absorbing rod lies on the grill and is exposed to the direct radiant, conducted and convected heat from the grill, it is not necessary to preheat the steak-cooking spike apparatus of the present invention before inserting it into the steak. The present invention does leave perforations in the edges of the steak, but in this edge location, the perforations generally go unnoticed by a diner eating the steak.

Another advantage of the present invention is that a steak may be cooked well done in approximately the same time as it takes to cook a steak to medium. Thus, using the present invention, it is possible to cook and serve well done and medium steaks in the same length of time. This advantage of the invention makes it particularly desirable and adapted for use in so-called fast food steak restaurants. Also, in order to cook a steak to a well done condition, without using the spike apparatus of the present invention, it is necessary to leave the steak on the grill for such an extended period of time that the steak is often charred or burned. By utilizing the present invention, a steak is cooked to a well-done condition in a reduced time period, and the danger of burning or charring the steak is diminished.

BRIEF DESCRIPTION OF THE DRAWINGS

The present invention may best be understood by reference to the Detailed Description of the preferred embodiment of the invention when considered in conjunction with the Drawings in which.

DETAILED DESCRIPTION

Figure 1:
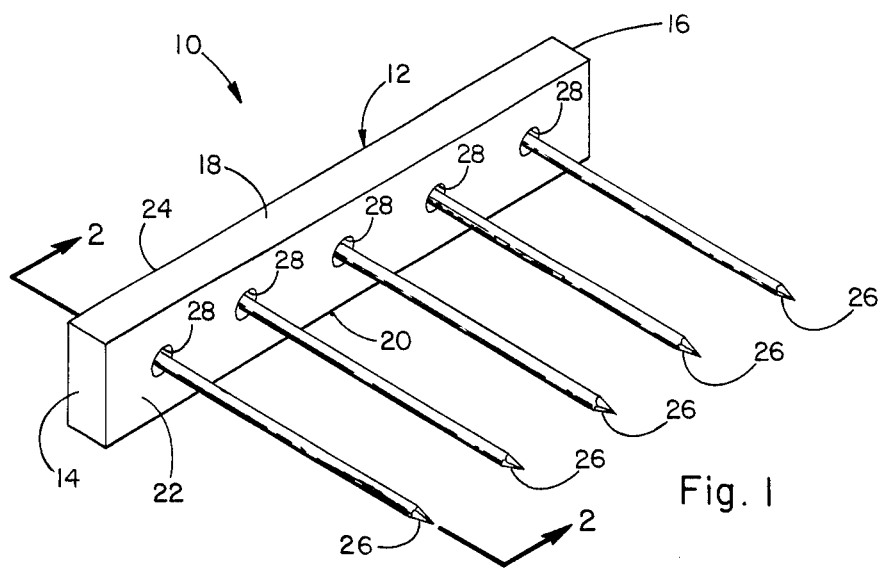
FIG. 1 is a perspective view of the steak-cooking spike apparatus of the present invention.

Referring now to the Drawings in which like reference characters designate like or corresponding parts throughout the several views, there is shown in FIG. 1 a perspective view of a steak-cooking spike apparatus 10 embodying the present invention. The spike apparatus 10 includes a heatabsorbing rod 12 that is preferably constructed of aluminum, but may be constructed of other materials, such as copper or stainless steel, that readily transmits heat. Rod 12 includes opposing ends 14 and 16 (16 is hidden from view) and the length of the rod is defined as the distance between ends 14 and 16. The rod 12 also includes a top edge 18 and a bottom edge 20 (20 is hidden from view). The width of rod 12 is defined as the distance from the top edge 18 to the bottom edge 20. The rod 12 also includes a front face 22 and a rear face 24, and the thickness of the rod 12 is defined as the distance from front face 22 to the rear face 24.

Figure 2:
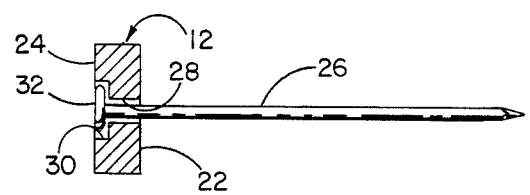
FIG. 2 is a cross-sectional view of a portion of the steak-cooking spike apparatus taken through section line 2—2 shown in FIG. 1.

A plurality of spikes 26 extend from the midregion of the rod 12 through a like plurality of bores 28. The spikes 26 are arranged in a row along the length of the rod 12 and extend in a parallel, co-planar relationship from the rod in a direction perpendicular to the width of the rod 12 and parallel to the thickness of the rod 12. The interconnection between the spikes 26 and the bores 28 is more clearly shown in FIG. 2 which is a cross-sectional view of the spike apparatus taken through section line 2—2 shown in FIG. 1. The bores 28 extend from the front face 22 through the rod 12 to the rear face 24 of the rod. A plurality of recesses 30 are formed on the rear face 24 of the rod 12 adjacent the bores 28 and aligned therewith. The spikes 26 extend through the bores 28, and heads 32 are formed on the end of the spikes 26 and are positioned within the recesses 30. The heads 32 and the recesses 30 are dimensioned so that the heads 32 will fit within the recesses 30. In the preferred embodiment, the spikes 26 and heads 32 are aluminum nails that are secured in the bores 28 and the recesses 30 by soldering or welding the spikes 26 and heads 32 in their proper positions as shown in FIG. 2.

Figure 3:
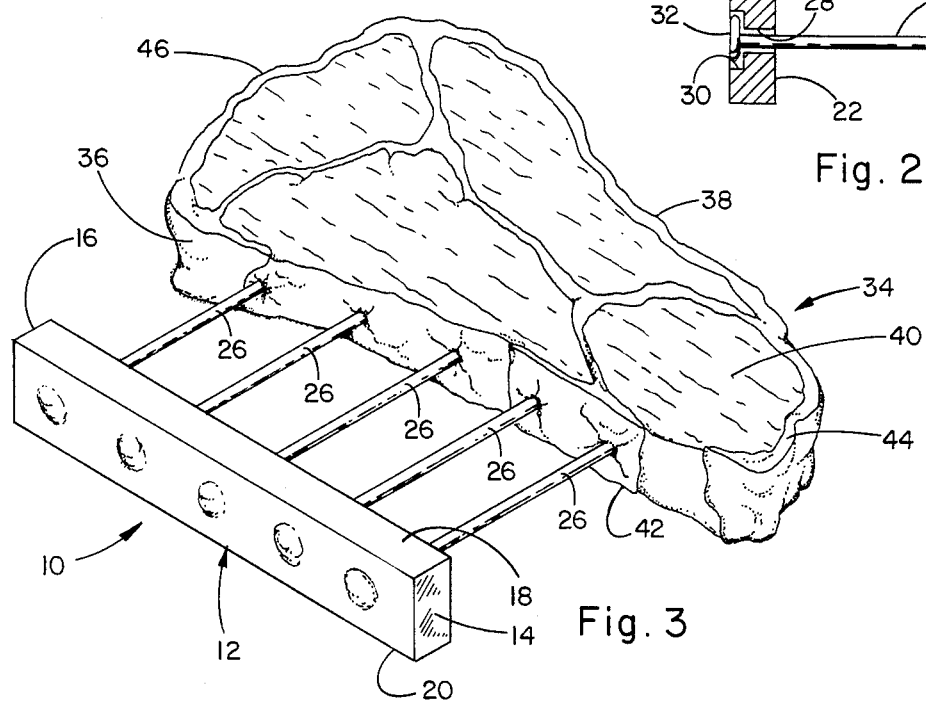
FIG. 3 is a perspective view of the steak-cooking spike in position to be inserted into a steak.

Referring now to FIG. 3, the spike apparatus 10 is shown in position adjacent a steak 34 just prior to inserting the spikes 26 into an edge 36 of the steak 34. Steak 34 includes a flat top side 40 and flat bottom side 42 (hidden from view), includes a front edge 36 and rear edge 38 (hidden from view) and includes opposing ends 44 and 46 (46 being hidden from view). The length of the steak is defined as the distance between the opposing ends 44 and 46, the width of the steak is defined as the distance between the front edge 36 and the rear edge 38 of the steak 34, and the thickness of the steak is defined as the distance between the top flat side 40 and bottom flat side 42. As will be appreciated by reference to FIG. 3, the length of the rod 12 is approximately equal to the length of the steak 34 and the width of the rod 12 is approximately equal to the thickness of the steak 34.

To insert the spike apparatus 10 into the steak 34, the spikes 26 are positioned adjacent to the midsection of the front edge 36 of the steak 34 and the spikes 26 are forced forward into the steak in a direction parallel to the top and bottom sides 40 and 42 of the steak so that the spikes 26 are positioned in the center interior of the steak 34. The spikes 26 are spaced apart one from the other at a distance approximately equal to the thickness of the steak 34. When spaced at this distance, the spikes 26 relatively evenly cook the interior of the steak.

Figure 4:
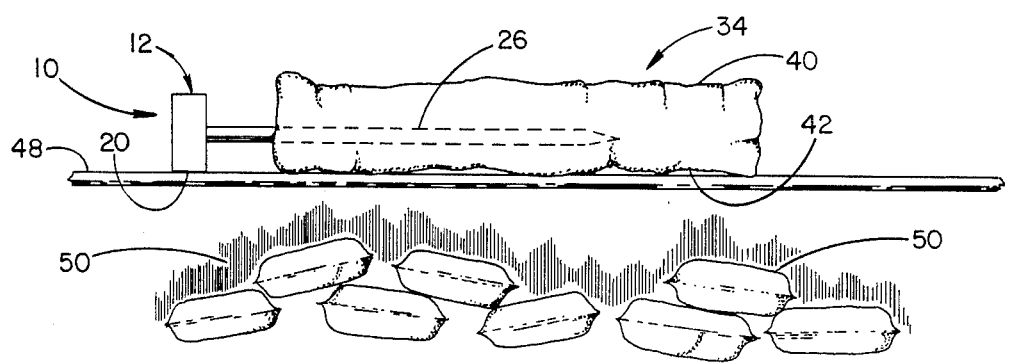
FIG. 4 is a somewhat diagrammatical side view of a steak cooking on a grill with the steak-cooking spike apparatus of the present invention inserted into the steak.

Referring now to FIG. 4, the spike apparatus 10 is shown inserted into the steak 34 and positioned for cooking on a grill 48 which includes a fire 50 or other source of heat. Heat is transferred from the grill 48 upwardly towards the steak 34 and the rod 12 by radiation, convection and conduction to both the bottom flat side 42 of the steak 34 and the bottom edge 20 of the rod 12. In this manner, the rod 12 absorbs heat while the steak 34 is being cooked on the grill 48. The heat absorbed by the rod 12 is transmitted through the spikes 26 to the interior of the steak 34. In FIG. 4, it is clearly shown that the width of the rod 12 is approximately equal to the thickness of the steak 34 and that the length of the spikes 26 are approximately equal to the width of the steak 34.

In one embodiment, spikes 26, such as shown in FIG. 1, may be dimensioned having a length of approximately one-half of the width of the steak 34 so that two steak spike apparatuses 10 may be used to cook the steak 34 by inserting one spike apparatus into either side edge of the steak. It is also contemplated that the rod 12 could be configured having a different shape, such as having a circular cross-section, and the rod 12 could have varying lengths, widths and thickness depending on the specific cooking environment in which the steak-cooking apparatus is used. Although particular embodiments of the present invention have been disclosed in the foregoing Detailed Description, it will be understood that the invention is capable of numerous rearrangements, modifications or substitutions of parts without departing from the spirit of the invention.

I claim:

1. A cooking spike apparatus for being inserted into a generally vertical edge of a steak having a predetermined length, width and thickness, the length and width of the steak being substantially greater than the thickness, for transmitting heat to the center of the steak while it is cooking on a generally horizontal grill comprising:

a horizontal heat-absorbing rod for being positioned adjacent to the generally vertical edge of the steak and immediately above the adjacent to the grill to absorb heat from the grill, said rod having a selected thickness, having a length of about the length of the steak and having a width of about the thickness of the steak; and a plurality of heat-conducting spikes having a diameter substantially smaller than the width of heat-absorbing rod extending from the midsection of said rod in a generally horizontal direction perpendicular to the width of said rod, said plurality of spikes being positioned in a row along the midsection of said rod and being oriented in a parallel, co-planar relationship for being inserted into the generally vertical edge of the steak and for being positioned in a spaced apart parallel relationship with the grill, so that the heat transmitted from the grill is absorbed by said rod and transmitted through said spikes into the center interior of the steak.

2. The spike apparatus of claim 1 wherein said spikes have a length approximately equal to the width of the body.

3. The spike apparatus of claim 1 wherein said spikes have a length approximately equal to one-half the width of the body.

4. The spike apparatus of claim 1 wherein said spikes are spaced apart on the rod at a distance approximately equal to the width of said rod.

5. The spike apparatus of claim 1 wherein said spikes comprise a plurality of nails attached to and extending from said rod.

6. The spike apparatus of claim 5 further comprising:
a plurality of bores formed in said rod extending in a direction perpendicular to the width of said rod and through the thickness thereof;
a plurality of recesses formed in said rod adjacent to and aligned with said bores;
a plurality of heads formed on the ends of said nails and being dimensioned to fit within said recesses;
said nails being positioned extending through said bores with said heads positioned in said recesses; and
means for fastening said nails in said bores and for fastening said heads in said recesses, said means for fastening being operable to transmit heat between said rod and said nails and heads.

7. A method for cooking a steak having a predetermined length, a width and thickness, the length and width of the steak being substantially greater than the thickness, on a generally horizontal grill comprising:
providing a cooking spike apparatus having a horizontal heat-absorbing rod of a selected thickness, of the length, of about the length of the steak and of the width of about the thickness of the steak, said cooking spike apparatus having a plurality of heat conducting spikes each having a diameter substantially smaller than the width of the heat-absorbing rod and extending from the midsection of said rod in a generally horizontal direction perpendicular to the width of said rod, said plurality of spikes being positioned in a row along the midsection of said rod and being oriented in a parallel co-planar spaced apart relationship;
inserting the cooking spike apparatus into the generally vertical edge of the steak with the plurality of spikes extending into the center interior of the steak in a parallel relationship with the width of the steak;
positioning the horizontal rod adjacent to the vertical edge of the steak;
positioning the heat-absorbing rod immediately above and adjacent to the horizontal grill to absorb heat from the grill;
positioning the steak horizontally on the grill to position the spikes in a spaced apart parallel relationship with the grill so that heat transmitted from the grill is absorbed by the rod and is transmitted through the spikes into the center interior of the steak.

* * * * *

UNITED STATES PATENT AND TRADEMARK OFFICE
CERTIFICATE OF CORRECTION

PATENT NO. : 4,745,968

DATED : May 24, 1988

INVENTOR(S) : Jim P. Demos

It is certified that error appears in the above-identified patent and that said Letters Patent is hereby corrected as shown below:

Column 1, line 20, after "2,404,166; insert --2,651,251 and 2,835,480; and baking racks having vertical pins or spikes for--.

Column 1, line 20, delete "cooling" and substitute --cooking--.

Column 1, line 23, delete "asteak" and substitute --steak--.

Claim 1, line 57 after the word "above" delete "the" and substitute --and--.

Signed and Sealed this

Twenty-second Day of November, 1988

Attest:

DONALD J. QUIGG

Attesting Officer

Commissioner of Patents and Trademarks